Figure 2:
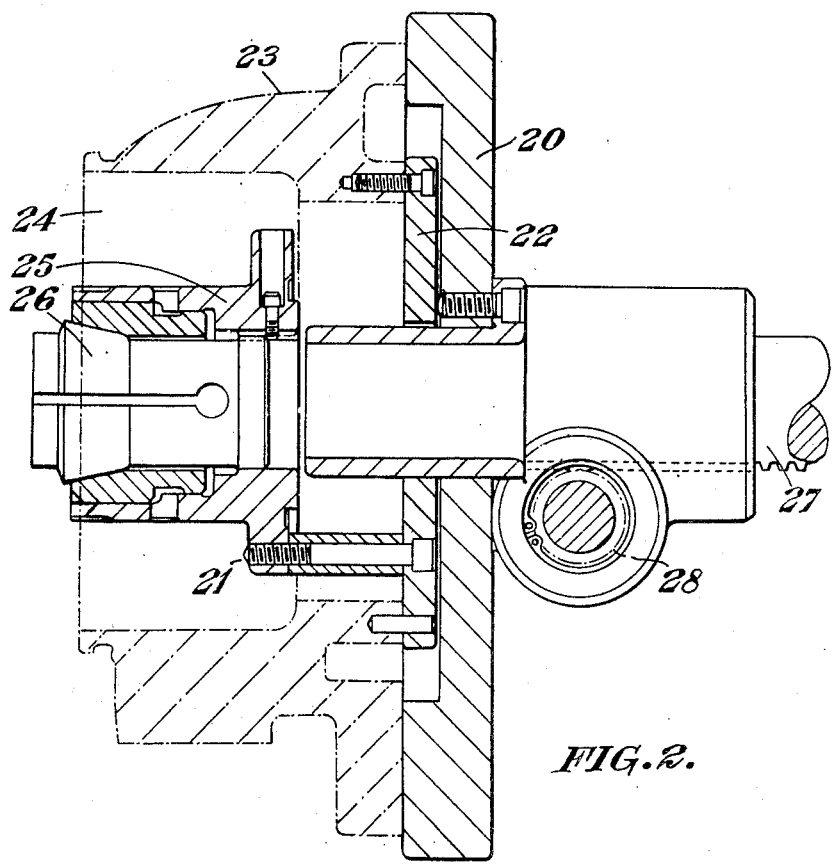

July 14, 1953  R. C. MILDNER ET AL  2,645,590
MANUFACTURE OF AIR SPACED ELECTRIC CABLES
Filed May 15, 1951  3 Sheets-Sheet 1
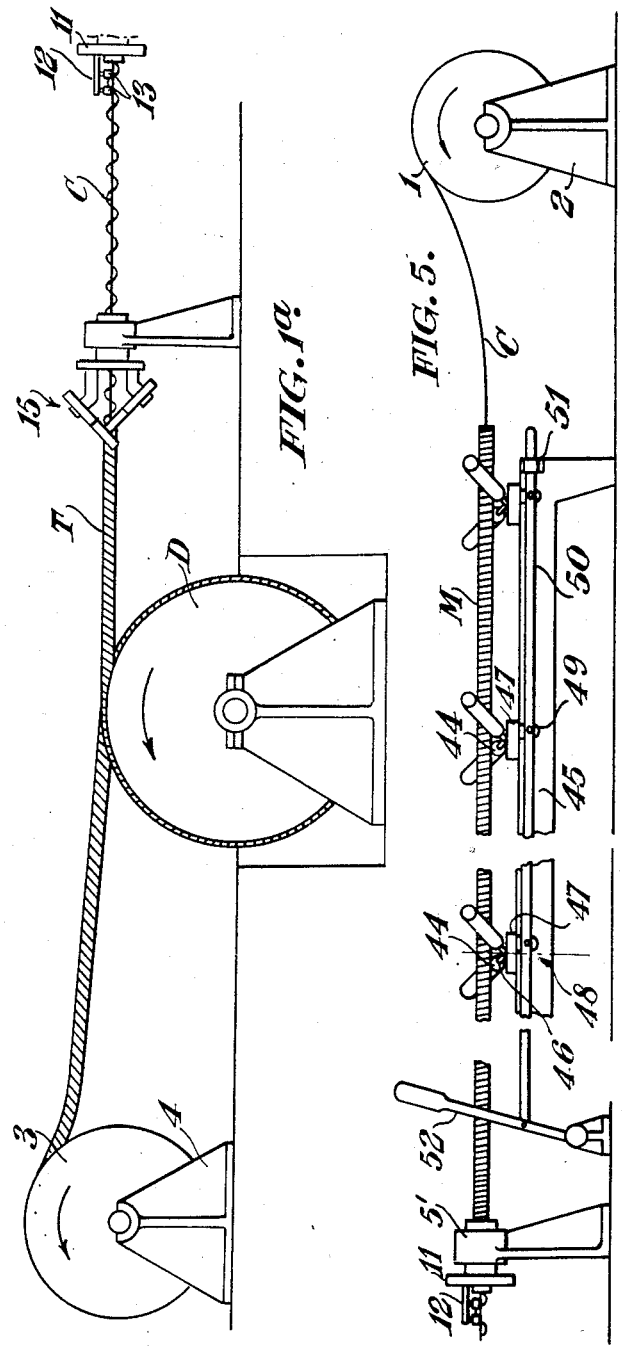

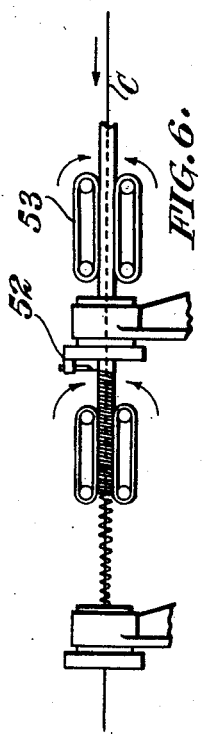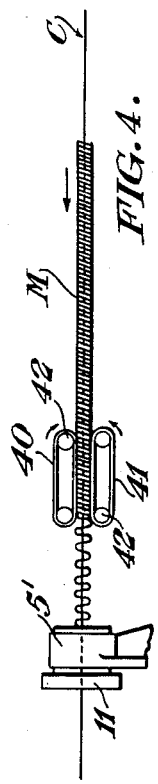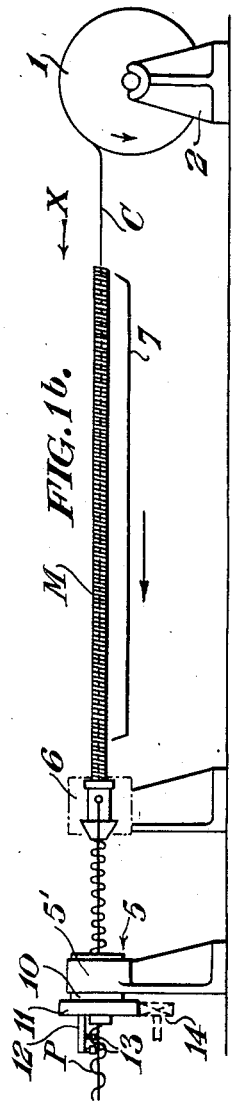

Patented July 14, 1953

2,645,590

UNITED STATES PATENT OFFICE 2,645,590

MANUFACTURE OF AIR SPACED ELECTRIC CABLES

Raymond Charles Mildner, Shirley, Oxhey, and Clive Edward Christopher Lovelace, Blackheath, London, England, assignors to Telegraph Construction & Maintenance Company Limited, London, England, a company of Great Britain Application May 15, 1951, Serial No. 226,376
In Great Britain May 16, 1950

13 Claims. (Cl. 154—2.26)

This invention relates to the manufacture of electric cables having an air space insulation.

In the specification of our prior British Patent No. 608,147 we described a method for the manufacture of a helical membrane for use in the production of the air space insulation of an electric communication cable. According to this method, a layer of dielectric material of predetermined dimension is applied to a former and then cut helically to provide a membrane which after separation from the former can be extended on to a conductor to support the latter relative to an outer conductor coaxial therewith with a substantial air space between the two conductors. In an alternative application, the helical membrane is first slotted and then applied to a central support, the slots being used to receive and locate a plurality of conductors in spaced relationship to one another.

The present invention is concerned with a method of applying the helical membrane to the central conductor or support and to apparatus for use in connection therewith.

It has been found that when applying the helical membrane, difficulties arise owing to the tendency of the membrane to twist when it is stretched for the purpose of properly locating it on the conductor or support.

According to the present invention, in the manufacture of an air spaced cable of the type set out, the helical membrane is applied to the conductor or support in an unstretched or incompletely stretched condition, means being provided to stretch the membrane when in position on the conductor or support.

In one way of carrying out the invention the leading end of the helix of the unstretched membrane is passed through a spacing head mounted to rotate about the conductor or support and arranged to engage between adjacent turns of the helix, the conductor or support carrying the helix being advanced at such a speed relative to the speed of rotation of the spacing head as to open the turns of helix to the desired pitch.

The present invention is particularly applicable to the manufacture of helical membrane-spaced cables in which the bore of the helix when unstretched is not less than the diameter of the conductor or support to which it is to be applied. Thus, in cases where the conductor or support is smaller than the internal bore of the helix it may simply be threaded through the unstretched helix. Alternatively the unstretched helix may be spun onto the conductor or support from a bobbin rotating about the latter.

After the helix has been opened out in accordance with the invention, the conductor and helical membrane may be passed through a lapping head or other device where dielectric or conductive tapes or an extruded sheath are applied over the membrane.

The unstretched part of the helix behind the rotary spacing head will tend to rotate about a longitudinal axis. To obviate this, means may be provided which operates to assist the rotation of the unstretched part of the helix so as to prevent it from becoming twisted beyond the point of stability. Alternatively a torque-reaction clamp may be disposed at a point behind the spacing head so as to prevent the twisting moment being transmitted along the whole length of the unstretched part of the helix.

Figure 3:
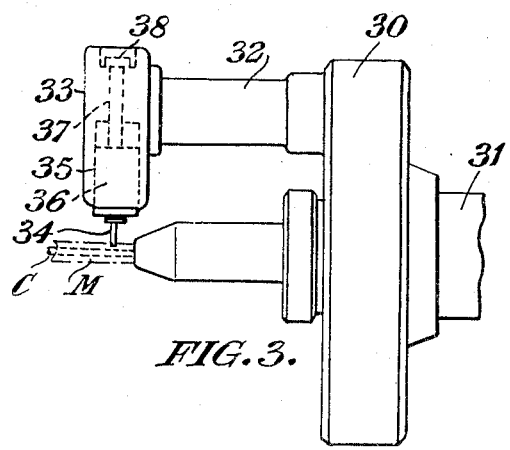

The invention is diagrammatically illustrated in the accompanying drawings in which Figures 1a and 1b are composite views in elevation of a machine for the application of a helical membrane to a conductor. Figure 2 is a detail sectional view on an enlarged scale showing the torque reaction clamp which forms part of the machine of Figure 1a and 1b. Figure 3 is an elevation also on an enlarged scale of the spacing head. Figure 4 is a detail view showing an alternative form of torque reaction clamp device for preventing the twisting moment imparted to the helix when opened out from being transmitted to the unstretched part of the helix. Figure 5 is a view showing a roller support for the conductor and helix.

Figure 6 is a part view in elevation of a machine in which the cutting and stretching of the helix is performed simultaneously in situ on the conductor.

Referring to the drawings, C indicates generally the conductor to which the air space insulation in the form of a helical membrane, is to be applied. It will be understood that in the method of this invention the helical membrance is obtained by extruding a layer of dielectric material onto a former of predetermined size in relation to the conductor, to which the membrane is to be applied, and then cutting the tubular layer so obtained into a helix, either when in position on the former or after it has been removed therefrom.

The helix M is next applied to the conductor in its unstretched form, the conductor with the helix in position thereon then being passed through a spacing head, in order to open up the turns of the helix to the desired pitch, as indicated at P.

In the arrangement shown, the required length of conductor C to which the helix is to be applied is unwound from a coil on a supply drum 1 mounted to revolve in a stand 2 and a length of helix threaded on to the conductor. At the far end of the machine runs a second drum 3, similarly mounted to revolve on a stand 4 and provided to receive the conductor and helical membrane.

The uncoiled length of conductor, onto which the helix M has been threaded is laid down flat in a horizontally extending support, which may consist of a trough 7, at the far end of which is a spacing head 5 wherein the turns of the helix are opened out causing the inner diameter to reduce in dimension sufficiently to bed itself down on the conductor.

Before passing into the spacing head 5, the conductor C with the unstretched helix M thereon is passed through a clamp device 6, which operates to retard the helix relative to the advancing conductor and to prevent rotation of the unstretched part M of the helix in the trough.

It will be understood that until the helix arrives at the clamp 6, it is free to move forward with the conductor C in the direction of feed, as indicated by the arrow X, and although the clearance between the conductor and the interior diameter of the helix may amount to several thousandths of an inch, due to the friction set up, the pressure on the helix tending to advance it with the cable is considerable and may easily exceed fifty pounds. The clamp 6 comes into operation to retard this tendency on the part of the helix M to move forward with the on-going conductor C. Immediately in front of the clamp 6 is the spacing head 5, which in the embodiment shown in Figures 1a, 1b comprises a part 10 journalled to revolve in the head piece 5' and fast with which is a carrier disc 11. Mounted on the carrier disc 11 is an arm 12 carrying a pair of rollers 13 between which the helical membrane passes to open out the turns.

Both the part 10 and disc 11 have a central opening of a size sufficient to permit the free passage of the conductor C and the helix M which is partly stretched.

The speed of rotation of the carrier disc 11 carrying the rollers 13 is co-ordinated with the linear speed of the advancing conductor and for this purpose may be coupled to the drive of the capstan D through suitable gearing indicated diagrammatically at 14.

It will be obvious that by co-ordinating the linear speed of advance of the conductor C in relation to the speed of rotation of the carrier disc 11 carrying the spacing rollers 13, the pitch of the stretched helix P can be varied as required.

After the helix has been opened out in accordance with the invention, the conductor and helical membrane may be passed through a lapping head 15 or other device where dielectric or conductive tapes T or an extruded sheath are applied over the membrane.

It will be found that a length of unstretched helix of say twenty yards is sufficient to cover a considerably greater length of cable amounting to several hundreds of yards.

Since the unstretched part of the helix behind the spacing head 5 tends to rotate about the axis of the conductor it is essential to provide some form of torque reaction clamp or other means to prevent the twist, thus set up, from extending along the unstretched part of the helix M.

The torque reaction clamp shown in Figure 2 comprises a back plate 20 adjustably carried on parallel racks 27 (one only of which is seen in Figure 2) extending in a direction parallel with the axis of the conductor, the racks and their adjusting mechanism being mounted on bridge plates supported by uprights (not shown). Secured to the back plate 20 is a location plate 22 supporting a cover plate 23. The cover plate 23 is provided with a central opening 24 for a sleeve 25 within which is a collet 26 for clamping over the oncoming helix M and conductor C, the sleeve being detachably secured by screw studs 21 to the location plate 22 so that it can be interchanged for larger or smaller sizes according to the diameter of the helix.

The force with which the collet bears on the helix is so adjusted that the frictional forces due to the fast moving inner conductor against the slow moving inner surface of the helix are sufficient to drive the helix against the longitudinal resistance due to radial pressure of the collet. The rate of feed may be adjusted manually while observing the number of turns of helix between the head and the collet; alternatively it may be adjusted automatically by known methods.

The position of the clamp behind the spacing head is quite critical, because a certain minimum distance is necessary to permit observation of the proper functioning of the feed, whilst the maximum separation is a function of the design of the helix and the material of which it is composed and if this maximum is exceeded, instability will be imparted to the helix and one or more turns will suddenly collapse and assume a reversed bend for part of the periphery. We have found somewhat unexpectedly that where a clamp is provided to restrict the total twist in the free length of helix, the helix can be made to absorb a certain amount of twist, by elastic or plastic strain. In a typical case, with polythene helix .040" thick and diametral dimensions 0.195" x 0.645", the maximum separation of the spacing head and the torque-reaction clamp was about 7½ inches.

Referring now to Figure 3 the spacing head may consist of a carrier plate 30 fast on a driven sleeve 31, the other end of which carries a pinion or chain wheel (not shown) for driving the spacing head at the required speed in relation to the rate of advance of the conductor C. Fast with the plate 30 is a bracket arm 32 which extends in a direction parallel to the longitudinal axis of the conductor and has mounted at its end a tubular housing 33. The housing 33 is adjustably carried by the arm 32 so that it can be swung into an inoperative position where a spacing pin 34 mounted therein lies out of the path of the helix. In order to permit of axial adjustment of the spacing pin 34, the housing 33 comprises a recess 35 in which is carried a socket piece 36 for the pin. Attached to the socket 36 is a screwed spindle 37 having a milled head 38 for adjusting the socket 36 and thus the pin 34 in a direction radially towards and from the helix. In order to reduce friction, the pin 34 may be rotatably supported in bearings in the socket 36.

In place of the adjustable collet type of clamp illustrated in Figure 2, we may utilize a caterpilar type of clamp to grip the unstretched helix. Conveniently this takes the form of two endless bands 40, 41 (Figure 4) mounted on rollers 42, one or both pairs of rollers being capable of adjustment in a direction to and from the central axis of the conductor so that the frictional grip may be varied and so that cut helix of different diameter may be accommodated. The drive to the rollers 42 is similarly synchronized with the speed of rotation of the spacing head and also with the rate of advance of the cable C so that the unstretched helix is fed forward to the spacing head at a sufficient rate to maintain constant the number of turns of helix between it and the spacing head.

As an alternative to clamping the unstretched helix to prevent its rotation by reason of the twisting moment imparted thereto when the turns are opened out in passing through the spacing head, means may be provided which operates to assist the rotation of the unstretched part of the helix so as to prevent it from becoming twisted beyond the point of stability. Such an arrangement is shown in Figure 5 where instead of the supporting trough 7, in which the conductor C with the helix M thereon is laid, it is supported on inclined rollers 44 arranged in pairs and spaced at intervals on a supporting frame indicated generally at 45. Each pair of rollers is supported so as to be capable of adjustment about a vertical axis so that the angle of the V-shaped channel provided may be made smaller or larger to suit operating conditions.

It will be appreciated that longitudinal movement of the unstretched helix over the rollers 44 will induce an axial twist in the helix when the plane of the rollers is not at right angles to the axis of the helix and thus facilitate the twisting of the helix about the conductor which is caused by the elongation of the helix at the spacing head.

In the arrangement shown, the rollers 44 are mounted to revolve about fixed spindles 46 carried by a base platform 47, the respective platforms 47 being mounted for angular displacement about their vertical axes indicated at 48. Each of the platforms 47 is provided with a depending arm 49 and by coupling the arms 49 to one another by a pull-and-push rod 50 supported at its ends in brackets 51 on the frame 45, the platforms 47 can be caused to rotate about their axes 48 so as to induce the correct degree of twist throughout the length of helix to the free end of the helix. Adjustment of the rod 50 may be by means of a hand lever 52 or automatically by other known means.

In the embodiment illustrated, the tube of dielectric material, which preferably consists of polythene, is cut into a helix prior to its being applied to the conductor. The cutting operation may be performed as described in our prior specification No. 608,147 either when the tube of dielectric material is on the former or after removal of the former from the extruded layer of material constituting the tube and from which the helical membrane is subsequently cut.

It should be understood, however, that the method and apparatus of this invention is not limited to such an arrangement and provision may be made to cut the tube into a helix after it has been applied to the conductor.

Figure 6 shows an arrangement for cutting and stretching the helix simultaneously when in position on the conductor. In this modification the dielectric tube previously obtained by extrusion or after removal from a former on which it has been extruded, is threaded on to the conductor C in the manner previously described and after passage through a suitable feed, e. g. a caterpillar device 53, encounters a rotary cutter 52 where the dielectric tube is cut into a helix as indicated. The helix now advances to the caterpillar 40, 41 and the operation of stretching and applying the helix to the membrane continues as described in Figure 4.

The term "conductor" as used in the appended claims should be read to include a support for a conductor or conductors.

We claim:

1. In apparatus for the manufacture of an electric conductor structure having an air space insulation including a helical membrane, the combination with means for supporting a length of conductor with a tube of dielectric material thereon in the form of a helix, a spacing head, means for drawing the conductor with the helix thereon past said spacing head, spacing means on said head operable during said drawing to progressively open out the turns of the helix and to lock the same into position on the conductor, and means in advance of the spacing head to neutralize the twisting moment set up when the turns of the helix are opened from being transmitted to the unstretched portion of the helix on the conductor.

2. In apparatus for the manufacture of an electric conductor structure having an air space insulation, the combination of means for supporting a conductor with a length of tube in the form of a helix and of dielectric material freely mounted on the conductor, the inner and outer diameters of which tube, are of predetermined size in relation to the diameter of the conductor, of a spacing head having means extending into the path of the unstretched helix to engage the same and open out the turns of the helix and to cause it to engage with the conductor as it is moved forward, and a clamping device located at a point in advance of the spacing head adapted to grip the oncoming unstretched helix in order to prevent the twisting moment imparted to the helix on opening out the turns thereof from being transmitted to the unstretched portion of the helix.

3. In apparatus for the manufacture of an electric conductor structure having an air space insulation including a helical membrane, the combination of means for supporting a length of conductor to which has been applied a tube of dielectric material cut into a helix, a spacing head located in the path of the advancing conductor and including a spacing member rotatable about the said conductor and adapted to engage the helix, means for advancing the conductor with the helix past said spacing head to open out the turns of the helix and means in advance of the spacing head to neutralize the twisting moment set up when the turns of the helix are opened and to prevent their being transmitted to the unstretched portion of the helix.

4. In apparatus for the manufacture of an electric conductor structure having an air space insulation including a helical membrane, the combination with means for supporting a length of conductor to which has been applied a tube of dielectric material, the inner and outer diameters of which tube have a predetermined relation to the diameter of the conductor, of a spacing head including a spacing member rotatable about the conductor for engagement with the helix, means for advancing the conductor with the helix thereon past the spacing head to open out the turns of the helix, and a clamping device located at a point in advance of the spacing head for gripping the unstretched helix to prevent the twisting moment set up in the helix on opening out the turns thereof from being transmitted to the unstretched part of the helix.

5. Apparatus as claimed in claim 4 in which the clamping device comprises endless moving elements located in advance of the spacing head and adapted to embrace the unstretched helix, and means for driving said elements to synchronize with the speed of rotation of the spacing head.

6. Apparatus as claimed in claim 2 in which the clamping device comprises an adjustable collet, and means for adjusting the collet to vary the pressure with which it grips the unstretched helix.

7. Apparatus as claimed in claim 2 in which the clamping device is supported for adjustment in a direction parallel to the axis of the conductor, and means is provided for adjusting the clamping device in a direction towards and from the spacing head.

8. In the manufacture of an electric conductor structure having an air space insulation, simultaneously moving the conductor and a tube of dielectric material thereon in the form of a helix, and during said moving stretching the turns of the helix to the required pitch to provide a helical membrane about the conductor.

9. In the manufacture of an electric conductor structure having air space insulation, simultaneously drawing a conductor and a tube of dielectric material disposed thereon in the form of a helix and by means following the helix engaging and stretching the helix during said drawing to the required pitch to provide a helical membrane about the conductor.

10. In the manufacture of an electric conductor structure comprising a central conductor and air space insulation provided by a helical membrane, threading a tubular length of dielectric material onto the conductor, drawing the conductor and the said tubular length with the latter in the form of a helix through a spacing head having a spacing member rotatable about the axis of the conductor for engagement with the helix and rotating the spacing member at a controlled speed in relation to the drawing movement of the conductor so that in passing through the spacing head, adjacent threads of the helix are separated to the required pitch and engaged with the conductor.

11. The method claimed in claim 10 wherein prior to entering the spacing head, the said tubular length is in the form of a helix and the conductor and helix are passed through a holding device to restrain the helix against twisting as the turns are separated by passage through the spacing head.

12. The method claimed in claim 10 in which the tubular length of dielectric material is in the form of a helix when threaded onto the conductor.

13. The method claimed in claim 10 including the step of supporting the unstretched portion of the helix by roller means adapted to induce twist therein as it is drawn to the spacing head in order to counteract the twist set up when the turns are opened out.

RAYMOND CHARLES MILDNER.
CLIVE EDWARD CHRISTOPHER
LOVELACE.

References Cited in the file of this patent

UNITED STATES PATENTS

| Number | Name | Date |
|---|---|---|
| 2,018,477 | Wentz | Oct. 22, 1935 |
| 2,334,880 | Marlow | Nov. 23, 1943 |

FOREIGN PATENTS

| Number | Country | Date |
|---|---|---|
| 608,147 | Great Britain | Sept. 10, 1948 |